Jan. 6, 1959     A. H. BRACKENSEY     2,867,049
DISPLAY APPARATUS
Filed March 29, 1954     4 Sheets-Sheet 1

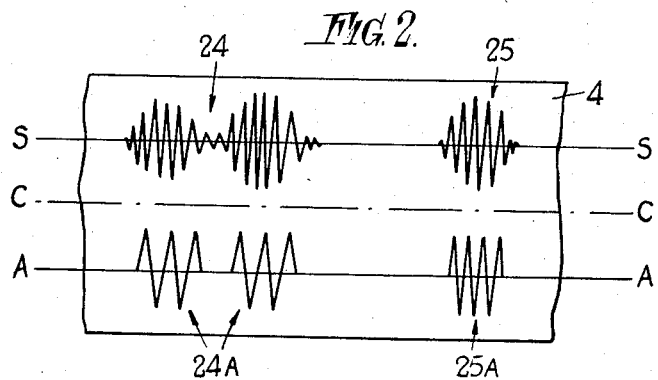
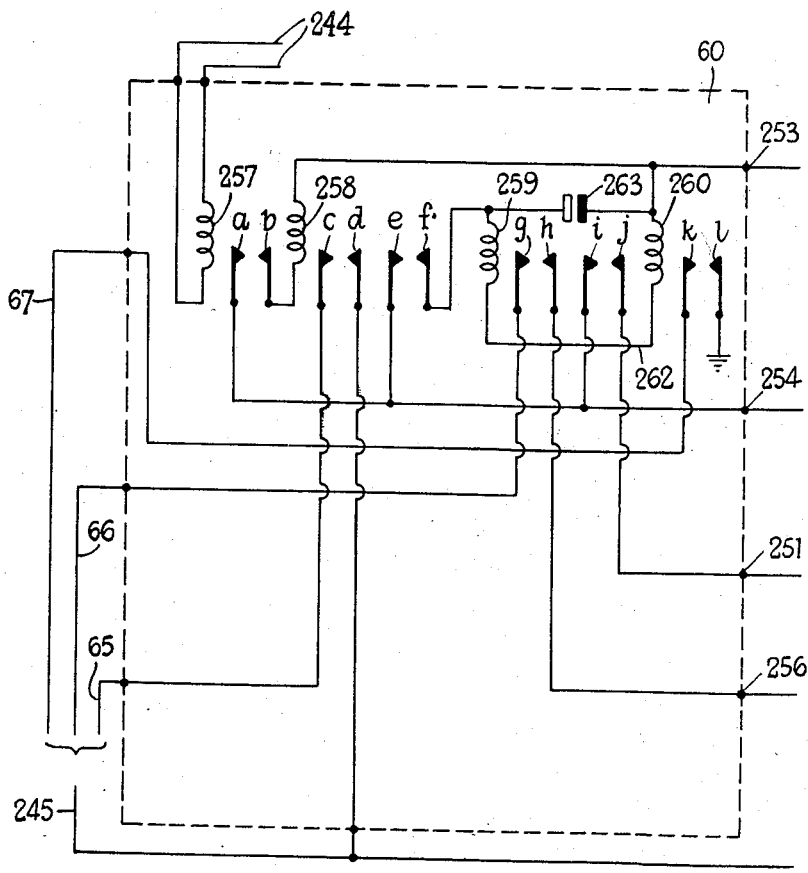

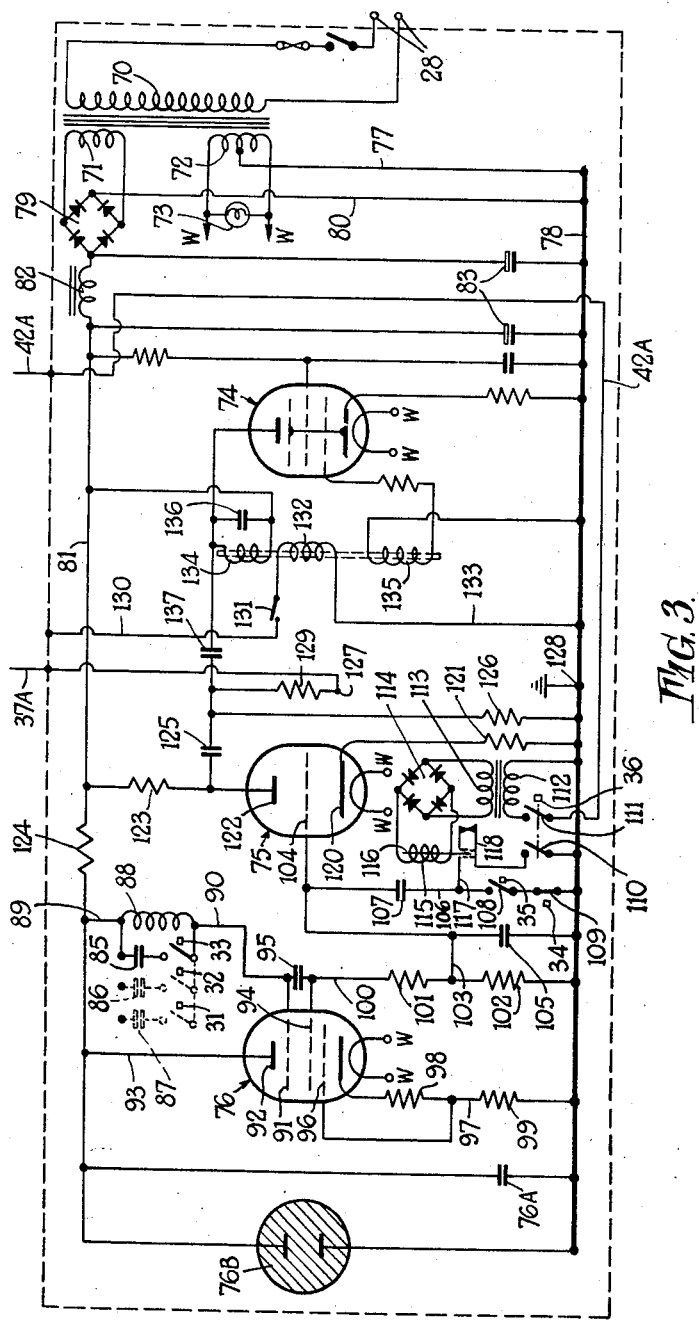

Jan. 6, 1959     A. H. BRACKENSEY     2,867,049
DISPLAY APPARATUS

Filed March 29, 1954     4 Sheets-Sheet 4

United States Patent Office 2,867,049
Patented Jan. 6, 1959

2,867,049

DISPLAY APPARATUS

Auguste Harry Brackensey, London, England, assignor of one-half to The Franco-British Electrical Company Limited, London, England, a British company Application March 29, 1954, Serial No. 419,544

Claims priority, application Great Britain March 31, 1953

11 Claims. (Cl. 40—28.3)

This invention relates to display installation such as may be employed for the purposes of advertising or of amusement.

In accordance with the invention there is provided a display installation comprising a model for simulating an animate individual, a plurality of movable members combined with the model and arranged upon activation to cause animation thereof, mechanism coupled to the movable members for mechanical activation thereof, a sound reproducer disposed in the proximity of said model, a frequency responsive selection device, connections between said mechanism and said selection device, a first component transducer arranged to be responsive to a recorded sound track on a tape, a second component transducer arranged to be simultaneously responsive to a recorded multi-frequency action track on said tape, said first and second component transducers together constituting a tape record transducing apparatus, said action track having thereon signals of different frequencies indicative of particular mechanical activations for the model related to the recorded sound, connections between said first component transducer and said sound reproducer and connections between said second component transducer and said frequency responsive selection device, said frequency responsive selection device being arranged to respond sequentially to the signals of different frequencies by permitting selectively, according to the nature of the signal, mechanism of the model to activate the latter.

Figure 1:
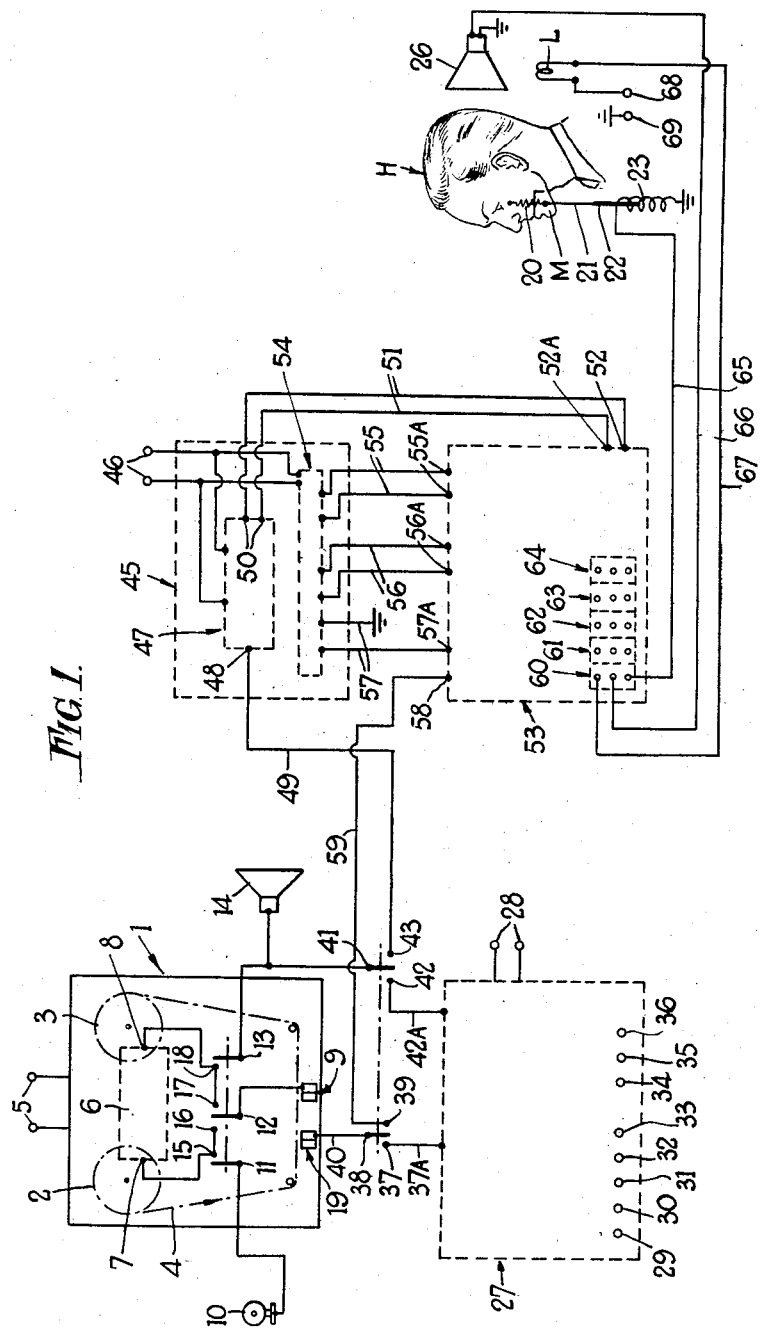
Figure 4:
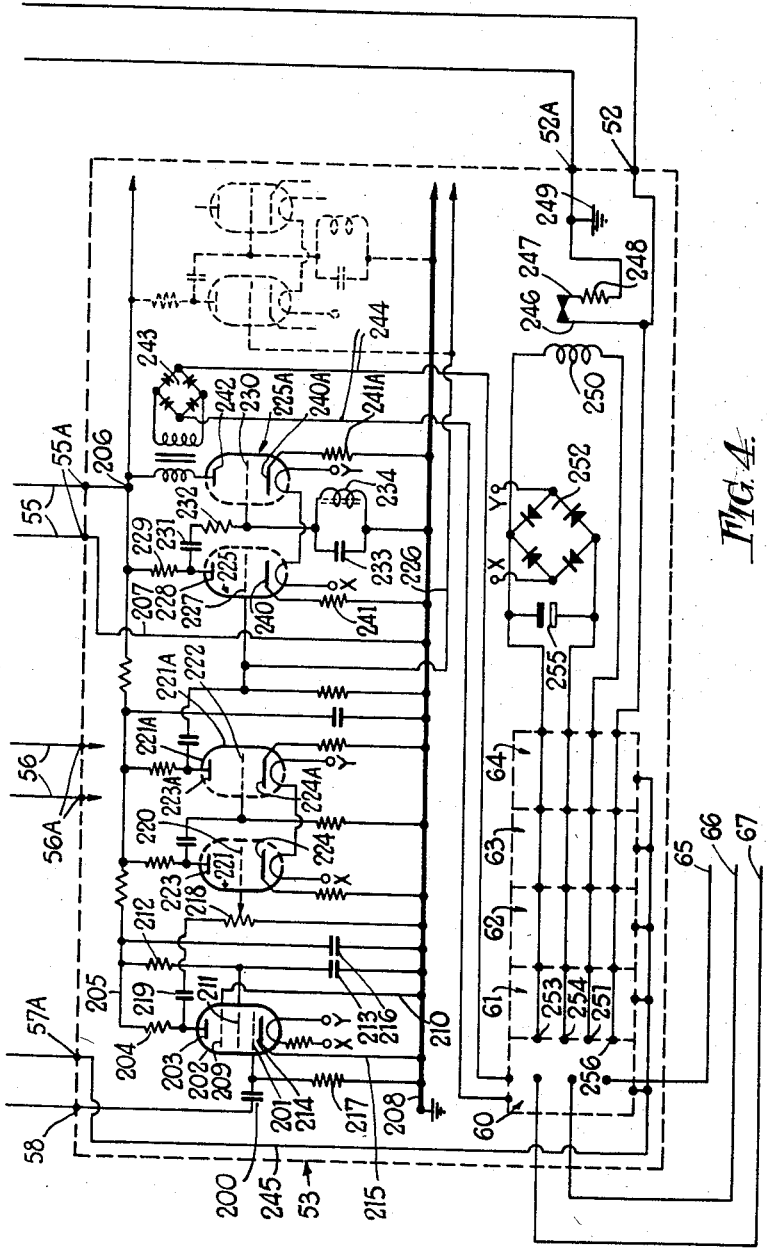

For a better understanding of the nature of the invention and to show how the same may be carried into effect, reference will now be made to the accompanying drawings in which:

Figure 1 is a diagram showing a complete simplified layout of a display installation, Figure 2 is a diagrammatically represented portion of a record/reproduce tape, Figure 3 is a circuit diagram of one of the units appearing in dotted outline in the layout of Figure 1, Figure 4 is a circuit diagram showing a further unit similarly appearing in Figure 1, and Figure 5 is a circuit diagram corresponding to one of a number of identical units appearing in Figure 1.

Referring now to the drawings, 1 indicates a tape record transducing apparatus of a kind generally well known. For the present purpose it will suffice to indicate that the apparatus 1 comprises spools 2 and 3 upon which is wound and unwound, a tape 4 capable of having magnetic impressions recorded upon it. An arrow head upon the tape 4 indicates the direction in which it runs when recording or reproducing is to be effected. The tape can be rapidly returned in the opposite direction for the purpose of re-winding the tape from the spool 3 to the spool 2. There are mains supply terminals 5 for feeding the electrical mechanism pertaining to the spools 2 and 3 and other parts of the equipment. The known apparatus such as 1 usually includes an electronic amplifier 6 diagrammatically shown as possessing an input terminal 7 and an output terminal 8. The tape passes adjacent to a record/reproduce head 9, which constitutes a first component transducer responsive to and capable of producing a recorded sound track on the tape and which in customary manner is divided into two portions, one of which is an eraser whilst the other is the record/reproduce device itself. When the apparatus 1 is being used for recording, in known manner, the eraser of the head 9 operates in advance of the recording device to ensure that any previous recording is removed from the tape. There is the usual microphone 10 connected to the pole 11 of a triple switch possessing three ganged switch arms. Another pole 12 of the switch is connected to the head 9, whilst a third pole 13 is connected to the monitoring loudspeaker 14. Poles 15 and 16 of the switch are connected one to the other and also to the input terminal 7 of the amplifier 6. The output terminal 8 of the amplifier is commonly connected to the remaining poles 17 and 18 of the switch.

It will now be appreciated that when the ganged switch is moved to the right, the microphone 10 will be brought into connection with the input 7 of the amplifier 6, and the output from such amplifier will be fed through poles 17 and 12 to the head 9. In this position of the ganged switch the apparatus is ready for sound recording. Assuming that the tape 4 is correctly driven in the direction indicated by the arrow head in Figure 1, sound directed to the microphone 10 will be correspondingly recorded by the head 9 upon the tape. When the desired sound recording is complete, the ganged switch may be brought to an opposite extreme position towards the left, whereupon poles 12 and 16 will be effectively connected and also poles 13 and 18. In this position, the head 9 is connected to the input terminal 7 of the amplifier 6, the output 8 then being connected to the monitoring loudspeaker 14. Hence the sound recording that was previously made may be audibly reproduced. The description given so far is a very brief description of the generally known form of tape recording and reproducing apparatus.

There is a second record/reproduce head 19 which is similar to the head 9, and thus possesses the usual preliminary erasing device for use when recording is taking place. This second head 19 constitutes a second component transducer responsive to and capable of producing a multi-frequency recorded action track on the tape. Thus the head 9 serves to apply in known manner, a signal representative of sound, whilst the second signal associated with the head 19 is one made to correspond to action. In Figure 2 there is shown diagrammatically a portion of a tape 4 divided centrally by a chain-dotted line C—C. Above this chain-dotted line there is a full line S—S which generally indicates the axis of the sound track, whilst below the chain-dotted line there is a full line A—A indicating the axis of the action track.

The "action" is concerned with some desired activity of a model in conformity with the sound to be reproduced simultaneously. In Figure 1 there is shown a head H of a model having a displaceable lower mouth portion M. Such mouth portion M is normally held in a closed position by a light spring 20. The mouth portion M may be pulled downwardly by a rod or wire 21 effectively connected to a solenoid core 22 of a solenoid winding 23. The "action" associated with the head H is the movement of the lower mouth portion M. The mouth activity represents but one illustrative example of the kind of action which may be produced, and which can correspond to appropriate sound. In the simplified installation illustrated in Figure 1, it is supposed that five different activities are required. Each activity may be assocated with a model so that there could be five models each having a head such as H. On the other hand it will be appreciated that more than one activity may be displayed by one model. Each of the activities are associated with a particular frequency of signals having equal amplitudes. The five different frequencies may for example range between 2000 cycles per second and 5000 cycles per second, the intervals between the frequencies being substantially constant.

In the diagram of Figure 2, the sound track S—S is shown as having recorded on it a two-syllable word and a one-syllable word. The two-syllable word is at 24 and the one-syllable word at 25. Corresponding to the recording 24 there are upon the action track two pulses 24A grouped closely together and a single impulse 25A. It may be supposed that the two pulses 24A are associated with the same activity (for example the movement of the mouth portion M of the head H) whilst the signal 25A is associated with another activity, and being thus of different frequency. (This activity may be the mouth movement of another model having a head similar to the head H.) Assuming that the sound represented by the recording 24 is to be attributed to the model H, then the action signal 24A consisting of two pulses is required to result in two opening movements of the mouth portion M in synchronism with the sound. The model H has an associated loudspeaker 26 which may be placed within the head itself. If the loudspeaker 26 reproduces the sound recording 24 whilst the appropriate double mouth movement is achieved by the action signal, then the head H will be animated appropriately. If a similar head (not shown) is grouped near the head H, then assuming that the similar head is also equipped with its own loudspeaker and action mechanism, then the different frequency signal pulse 25A can actuate the mouth of the second head whilst a corresponding monosyllabic word 25 is reproduced. In this way various parts of the sound track will be attributed to various models, and the action track will ensure activities of appropriate models by selection on the basis of the characteristic frequency associated with each model. The action track can also be used to ensure that an appropriate loudspeaker (i. e., that whose model is to be animated) reproduces the sounds. In order further to assist in identifying a particular model that is activated, each model may have an associated illuminating means. Thus the model H has a lamp L which may be disposed within the head itself, the arrangement being such that the lamp will be illuminated when sound is attributable to the model.

In preparing a tape for use in subsequently producing animation of models, it is convenient first to make the complete sound recording along the track S—S. Thereafter the action recording consisting of pulses of certain predetermined frequencies, can be "dubbed" upon the tape which already has the sound track recorded thereon. For this purpose a dubbing unit 27 is employed. From Figure 1 it will be seen that the unit 27 possesses mains input terminals 28. There are five press buttons 29 to 33 grouped together and three further press buttons 34, 35 and 36. The five buttons 29 to 33 are for selection of a particular predetermined frequency for dubbing on the action track. The dubbing unit 27 is arranged either for automatic dubbing or for manual dubbing. If manual dubbing is required the button 35 is pushed to an inner position which ensures that the button 36 is brought to an outer position. If automatic dubbing is required, then in a similar way, the button 36 is pushed inwardly which causes the button 35 to move outwardly. Hence the button 36 may be regarded as being associated with "automatic dubbing," whilst the button 35 is for setting to "manual dubbing." When manual dubbing is employed, the button 34 has to be depressed to cause any action signal to be dubbed upon the action track. So long as the button 34 is depressed whilst the button 35 is similarly depressed, then the corresponding length of pulse will be dubbed, the frequency of that pulse being selected by pressing any one of the buttons 29–33. Hence the button 34 acts like a morse tapper key. During automatic dubbing, i. e., the button 36 is depressed, it is necessary only to operate any one of the buttons 29 to 33 for frequency selection.

The output from the unit 27 is connected by a lead 37A to one pole 37 of a three-pole change-over switch. The output does, of course, consist of constant amplitude pulses, the duration of which is manually or automatically controlled, whilst the frequency of which is manually selected in the manner previously indicated. The three-pole switch has two further poles 38 and 39. The pole 38 is joined by a connection 40 to the second record/reproduce head 19. The three-pole switch 37, 38, 39, is ganged to a similar three-pole switch 41, 42, 43. The pole 41 is connected to the pole 13 and is therefore on the same circuit as the monitoring loudspeaker 14. The pole 42 is connected by a lead 42A to an input of the dubbing unit 27. This input is employed during automatic dubbing as will be explained hereinatfer. When the ganged switch arms associated with the poles 38 and 41 are moved to the left, it will be appreciated that the dubbing unit is effectively connected to the apparatus 1, since the output lead 37A is joined to the head 19, whilst the input 42A is joined to the pole 13. As already indicated above, it is convenient first to record the sound track. It may be supposed that after sound recording has been completed, the tape is wound back onto the spool 2. The ganged switch arms associated with the poles 11, 12 and 13 are then brought to their extreme left position whilst the tape 4 runs in the arrowed direction. Hence sound is reproduced from the monitoring loudspeaker 14. Audio-frequency signals are simultaneously fed to the input 42A of the dubbing unit 27, and the output from the latter is fed by lead 37A effectively to the head 19 which then acts as a recording head. By listening to the monitoring loudspeaker 14, dubbing may proceed manually, or automatically, by appropriate use of the buttons 29 to 36 as previously described.

There is a power unit 45 having a pair of mains input terminals 46. The unit 45 is illustrated only in Figure 1, and here diagrammatically, for the reason that it contains elements of well known construction and character. Thus there is a multi-stage electronic audio-frequency amplifier 47 having an input 48 connected by a lead 49 to the pole 43. (In the drawings, to simplify the indications of wiring, wherever possible pairs of wires are shown only as one, the other being imagined to be earth connected. As will be realized, in practice it will not always be desirable to employ earth returns, since this may lead to undesired interference or excessive losses.) The output 50 of the amplifier 47 is joind by leads 51 to input terminals 52, 52A of a decoding unit 53, the nature of which will be explained in detail hereinafter. The amplifier 47 may be of any well known kind and preferably has the valves arranged in push-pull. The power unit 45 also includes a power pack 54 arranged to give various outputs. Three pairs of output terminals are shown, these being joined by leads 55, 56 and 57. These leads extend to corresponding input terminals 55A, 56A and 57A of the decoding unit 53. It will suffice for the present to indicate that the input 55A is concerned with the supply of a high tension D. C., whilst the input 56A is concerned with low tension A. C., and finally the input 57A is a medium voltage D. C. (such for example as 50 volts) for operation of solenoids, such as the solenoid 23. There is another input 58 to the decoding unit 53, this input being connected by a lead 59 to the pole 39.

During the time that the ganged switch arms associated with the poles 38 and 41, have together been moved to the left, it will be appreciated that the pole 13 is effectively connected to the lead 42A, whilst the head 19 is connected to the lead 37A, both these leads being associated with the dubbing unit 27. At this time the power and decoding units 45 and 53 are isolated. This is, of course, the time when the action track is being dubbed upon the tape 4. If now the ganged switch arms associated with the poles 38 and 41, are moved towards the right, then it will be seen that the head 19 is now connected via 40, 38, 39, 59 to the input 58 of the decoding unit 53. The apparatus 1 is now set to reproduce on both heads 9 and 19. Hence the switch having the poles 11, 12 and 13 has its switch arms moved to the left, and the output of the amplifier 6 is fed to the monitoring loudspeaker 14 and also to the pole 41 from whence, via pole 43 and lead 49, this output is fed to the input 48 of the audio-frequency amplifier 47. The amplified output therefrom is fed to input terminals 52 and 52A of the decoding unit 53.

The decoding unit 53 has five output relay units, 60, 61, 62, 63, and 64. Each one of these relays is concerned with a particular activity. Only the relay 60 is shown as being connected by three lines 65, 66 and 67 for producing animation (i. e. action plus sound and illumination) of the model H. It is however to be understood that each one of the four remaining relay units 61, 62, 63 and 64, may be connected with four further models, such as H, or with four different mechanisms to obtain four different further activities i. e., different from the mouth movement envisaged in the drawing in connection with the head H. The lead 65 is connected with the solenoid 23, whilst the lead 66 is joined to the loudspeaker 26. The lead 67 joins one side of the lamp L, the other side of which is joined to a mains terminal 68. The other terminal 69 of the mains is shown earthed.

It will now be appropriate to indicate in greater detail a constructional example of the dubbing unit 27. Reference is directed to Figure 3 which is a diagram of this unit. The mains terminal 28 are joined through a switch and fuse to the primary winding 70 of a transformer having two secondary windings 71 and 72. The secondary winding 72 serves for the energisation of a warning light 73, and also for the heater windings of three indirectly heated valves 74, 75, 76. The terminals of these heater windings are all designated W, W and they are all parallel connected to the output W, W of the winding 72. There is also a tapping 77, joined to a common line 78 that may conveniently be regarded as the earth line. The other secondary winding 71, is connected to a selenium rectifier 79 producing high tension D. C., for H. T. supply purposes. One side of the output of the rectifier 79 is connected by a lead 80 to the common line 78. The other side is connected to the positive common line 81 in conventional manner through a smoothing choke 82. Likewise, in conventional manner, there are electrolytic smoothing condensers 83 in association with the choke 82.

Three (31, 32 and 33) of the push buttons 29 to 33 of Figure 1, are indicated in Figure 3. It will be understood that there are two further push buttons which have been omitted for clarity of illustration. Each of the push buttons when depressed closes an associated switch to bring the condenser 85, 86 or 87 into parallel with a coil 88. It will be realised that depending upon which of the buttons is depressed, so a parallel resonant circuit with one of the condensers will be established in relation to the inductance 88. The latter is joined by a lead 89 to the positive line 81, and also by a lead 90 to the grid 91 of the valve 76. The valve 76 is a transitron pentode oscillator. The anode 92 is connected by lead 93 also to the common line 81. The second grid 94 of the valve is coupled to the first grid 91 through a condenser 95. The third grid 96 of the valve is connected to the cathode lead 97 thereof between resistors 98 and 99 which determine the bias for the grid 96. It will suffice to indicate that there is a connection 100 from the condenser 95 through resistances 101 and 102 to the earth line 78.

When the transitron oscillator 76 is operating in conventional manner, it will be supposed for the sake of illustration that the button 33 is pressed so as to bring the condenser 85 across the inductance 88. In this way a particular parallel resonant circuit will be produced as between the condenser and the inductance, with a particular time constant corresponding to a particular chosen resonant, characteristic frequency. The transitron oscillator will initiate oscillation at the resonant frequency of the parallel resonant circuit by effectively causing a negative resistance to appear across the inductance 88. As a result the valve will tend towards cut off by virtue of the action of grid 91. This action will be reinforced by the coupled grid 94, and the cycle will be repeated so that the valve will oscillate at the desired frequency chosen by depressing the button 33. The grid 96 will exert control in the sense of being a current limiting grid. The condenser 76A is provided to stimulate oscillation of the valve 76, and voltage is stabilised by the gas-filled diode stabiliser 76B. The resistors 101 and 102 form the grid load of the valve 76 and between them the output is derived. The output connection 103 is joined to the control grid 104 of the valve 75, and is also joined through a condenser 105 to the earth line 78. It is desirable to ensure that the amplitude of the output from the oscillator 76 should be constant throughout the range of frequencies available by depressing any of the buttons 33 to 29. There is a tendency with the transitron oscillator for the amplitude to increase with higher frequency output. This is checked by the condenser 105 which is connected across the resistor 102, the reactance of the condenser 105 decreasing with increase of output frequency, thereby maintaining a substantially constant amplitude output from the oscillator. The grid 104 is connected also with a lead 106 extending to the earth line 78 via condenser 107 and switches 108 and 109. The switch 108 is controlled by the button 35, whilst the switch 109 is controlled by the button 34. It will be recalled that the button 35 is for manual dubbing. Depression of button 35 closes the switch 108. The switch 109 is normally closed and hence the grid 104 is effectively connected to earth and no signals are impressed upon the grid of the triode 75. If the button 34 is depressed, the short produced by the lead 106 is no longer effective, and signals will be received on the grid of the triode 75. It will be recalled that the bringing of the button 35 to the depressed position, will cause the button 36 to move in the opposite direction and vice-versa. The button 36 controls ganged switches 110 and 111. These switches are shown open in the drawings, but it will be understood that they should be closed if the switch 108 is open. The switch 111 is connected to one side of a primary winding 112 the other side of which is connected to the common earth 78. The primary winding 112 forms part of a transformer having a secondary winding 113. The winding 113 is connected to opposite junctions of a selenium rectifier bridge 114. The D. C. output junctions of the bridge rectifier 114 are connected with a solenoid winding 115, provided with a core 116. The latter is downwardly extended to pass through the stationary upper contact arm 117 of a switch possessing a movable contact arm 118. The depending end of the core 116 engages the contact arm 118 in such a way that when the solenoid 115 is energized, the core 116 moves downwardly and opens the normally closed switch contacts of the arms 117 and 118. The switch arm 117 is connected with the lead 106, whilst the switch arm 118 is connected to one side of the switch 110, the other side of the latter being connected to the earth line 78. It will therefore be appreciated that the series arranged switches 110 and 117, 118 are in parallel with the switches 108 and 109. The switch 111 is connected to the input lead 42A extending from the pole 42 previously described with reference to Figure 1. The input lead 42A brings audio-frequency signals from the apparatus 1 when the latter is sound reproducing. For the purpose of explanation it will be supposed that the input upon the lead 42A may be represented by the signals 24 and 25 diagrammatically shown in Figure 2. The signal 24 corresponds to a double syllable word, whilst the signal 25 corresponds to a separate further single syllable word. The signal 24 has two amplitude peaks whilst the signal 25 has only the one amplitude peak. When the signal 24 is applied to the input line 42A with the switches 110 and 111 closed, (with therefore the switch 108 open), the signal 24 will appear as two distinct (but closely spaced) D. C. pulses in the solenoid winding 115. Hence the switch arm 118 will be moved downwardly twice for substantially the duration of the two syllables constituting the signal 24. Hence the grid 104 of the triode 75 will be shorted to the earth line 78 except for the two time intervals when the switch 117, 118 is open. Whilst this switch is open, the triode 75 can receive effective output upon its grid 104 from the oscillator 76. In this way automatic dubbing is effected.

The triode 75 has a cathode 120 connected through a cathode load resistor 121 to the earth line 78. The anode 122 is connected through the anode load resistance 123 to the positive H. T. line 81. There is the usual stage decoupling resistance 124. The triode 75 is arranged as an R/C amplifier, the coupling condenser being indicated at 125. The output from the valve 75 is shunted by the load resistor 126, the output terminals being indicated at 127 and 128. For convenience of illustration it is supposed that the output terminal 128 is earthed whilst the other output terminal 127 is joined to the output lead 37A which was first described with reference to Figure 1 of the drawings. The record/reproduce part of the head 19 is connected through a switch as previously described to the lead 37A, and a matching resistance 129 is therefore included. It is, of course, assumed that one side of the record/reproduce head 19 is earthed.

As was previously explained, the apparatus 1 is generally of a type well known. The apparatus 1 includes the electrical devices for insuring appropriate energising of the erase portion of the head 9, the high frequency signal used for the erase, being employed also in known manner for biasing of the head 9. The extra head 19 has the erase and bias means, located in the dubbing unit 27. It will suffice to describe these known means only briefly with reference to Figure 3. So as not to complicate unnecessarily the diagram of Figure 1, the connection from the erase part of the head 19 has not been drawn thereon. This connection is however shown in Figure 3 at 130. The return connection from the erase portion of the head 19, is assumed to be earthed. The lead 130 includes a switch 131 for controlling when the erase signal shall be fed to the output lead 130. From the switch 131, the lead 130 effectively extends to an inductance 132 which is connected by a lead 133 to the common earth line 78. The inductance 132 is dust core coupled to two further inductances 134 and 135. The valve 74 is an output pentode connected in conventional manner to act as an oscillator. The frequency of oscillation is determined by the resonant circuit consisting of the inductance 134 and a suitably chosen condenser 136. It will suffice to indicate that the frequency from the output of the oscillator is in the region of about 50 kilocycles per second and appears in the inductance 132, so as to be available for feeding to the output lead 130. The coupling condenser 137 ensures that the output from the oscillator is constantly applied as a component in the output fed to the lead 37A. This is for producing the usual biasing of the record/reproduce part of the head 19 during recording.

Thus in summary, the dubbing unit develops from the oscillator 76 signals whose frequency is chosen by depressing any one of the buttons 29–33, such output being maintained at constant amplitude and being applied to the amplifying valve 75 so that finally there is fed from the dubbing unit an amplified signal of frequency that is selected. This signal is constantly fed to the output lead 37A during "manual" dubbing only whilst the button 34 is depressed, or during "automatic" dubbing whilst audio-frequency signals above a certain level of amplitude are being fed to the input lead 42A of the dubbing unit.

The decoding unit 53 of Fig. 1 will now be described with reference to Fig. 4. The input 58 is connected through a coupling condenser 200 to the control grid 201 of a high gain pentode amplifier valve 202. The latter has the anode 203 connected via the anode resistor 204 to a common HT positive line 205 connected at 206 to one of the HT input terminals 55A. The other terminal 55A is connected by lead 207 to a common negative, or earth, line 208. The suppressor grid 209 of the valve 202 is joined by lead 210 to the line 208, whilst the screen grid 211 is connected in the usual manner via resistor 212 and decoupling condenser 213 to the lines 205 and 208, respectively. The cathode 214 is connected by lead 215 to the line 208, such cathode being indirectly heated by a supply connected between terminals X, Y. The latter are joined by connections (not shown) to terminals 56A. All other terminals indicated by X, Y are similarly joined (although not so shown) to these same terminals 56A.

A stage decoupling condenser 216 is connected between the lines 205 and 208, whilst a grid leak 217 is located between the control grid 201 and the line 208. The pentode 202 thus operates on the principle of grid leak bias amplification. The output appears across a potentiometer 218 joined to the anode 203 through a coupling condenser 219. The output is fed to the first control grid 220 of a double triode 221, 221A, the latter having a second control grid 222, anodes 223, 223A, and cathodes 224, 224A. The double triode is conventionally connected as a simple two stage R/C amplifier as shown. The amplified output is fed in parallel to the first control grid of each of five further double triodes, only one of which is indicated at 225, 225A in Fig. 4. The remaining four double triodes are identically arranged between the lines 205 and 208, the first control grid of each being connected in common to the line 226 connected in parallel with the grid 227 of the triode 225.

The triode 225 has its anode 228 joined to the line 205 through the resistor 229, and to the grid 230 of the triode 225A through the coupling condenser 231 and resistor 232. The grid 230 is joined also to a parallel resonant circuit formed by a condenser 233 and inductance 234, connected to the earth line 208. The parallel circuit including the condenser 233 and inductance 234 is resonant at a particular frequency adjusted to be equal to the frequency of the action signal produced by the dubbing unit 27, when, say, the button 29 thereof is depressed. If the output of the triode 225 as applied to the grid of the triode 225A, happens to be at the particular frequency at which the parallel circuit including components 233 and 234 is resonant, then the terminal reactance of such circuit is high, and the output from valve 225 is effectively applied to the control grid 230 of the triode 225A. When such output is not at (or very near) the resonant frequency, the terminal reactance of the circuit including the components 233 and 234 is low, and hence no signals are effectively applied to grid 230. The D. C. resistance of winding 234 is, of course, low. It will be recalled that signals having five different frequencies can be dubbed into the tape 4. Hence a signal can be fed to the lead 58 having any one of these five frequencies. According to which frequency is concerned, so will one of the five double triods (such as 225, 225A) respond.

The double triode 225, 225A has cathodes 240, 240A connected through bias resistors 241, 241A to the line 208. The resistor 232 is chosen of such value as to increase selectivity, whilst the anode 242 is transformer coupled to a selenium rectifier bridge network 243. There will, of course, be five such networks, each one being connected at its D. C. supply junctions by pairs of leads extending to a particular one of the relay units 60 to 64.

In Fig. 4, the network 243 is shown connected by leads 244 to the relay unit 60.

The input 57A of the decoding unit is joined by a lead 245 to each of the relay units, in parallel. The input terminals 52, 52A are respectively connected to movable and fixed contacts 246 and 247. The connection to the contact 247 includes a dummy load resistor 248, and is earthed as at 249. The contact 246 is normally closed onto contact 247, hence bringing the dummy load across the leads 52, 52A and preventing open-circuiting of the output from the amplifier 47 of the power unit 45. The contact 246 can be drawn away from 247 under the influence of a winding 250, one end of which is parallel connected to each of the relay units 60 to 64 (the connection being indicated at 251 for the unit 60). The other end of the winding 250 is connected to one D. C. junction of a selenium rectifier bridge network 252 having A. C. input terminals X, Y, connected in the same way as the other previously described terminals X, Y. The D. C. junctions of network 252 are also connected to each of the relay units 60 to 64, in parallel (the connections for the unit 60 being indicated at 253 and 254) such junctions being shunted by the electrolytic smoothing condenser 255. Finally, the contact 246 is connected to each of the relay units in parallel, the connection for the unit 60 being indicated at 256.

It remains now to describe a typical relay unit 60. This is shown in Fig. 5, to which reference will now be made. These are four relay windings 257, 258, 259 and 260 which respectively operate (1) the contact pair *a, b*, (2) the two contact pairs *c, d* and *e, f*, (3) the two contact pairs *g, h*, and *i, j*, and (4) the contact pair *k, l*. Winding 257 is fed from leads 244 whilst winding 258 is at one end connected to contact *b* and at the other end to terminal 253. Winding 259 is at one end connected to contact *f*, and at the other end is joined by a lead 262 to one end of winding 260. The other end of the latter is connected to the terminal 253. A high capacity electrolytic condenser 263 completes the circuit between the windings 259 and 260. Contacts *a, e* and *i* are joined to terminal 254, whilst contacts *d, c, g* and *k* are respectively connected to leads 245, 65, 66 and 67. Contacts *j, h* and *l* are joined respectively to terminals 251, 256, and earth.

To understand the operation of the relay unit 60, a description will now be given on the assumption that the tuned double triode 225, 225A of the decoding unit has responded to an incoming signal of appropriate frequency, and is therefore producing a D. C. output upon its bridge network 243, and hence on leads 244. The winding 257 is thus energised. The relay 257/*a, b.*, is fast acting, and requires only low power energization. The contacts *a* and *b* are brought together, and hence the heavier duty relay 258/*c, d, e, f*, has its winding 258 energised from the terminals 253 and 254. Thus contacts *c* and *d* are brought together as also *e* and *f*. *c* and *d* connect the leads 245 and 65, and hence the solenoid 23 (Fig. 1) is energised. *e* and *f* bring the relay windings 259 and 260 into series across the supply terminals 253 and 254, and simultaneously connect also the condenser 263 across such terminals. Thus both the windings 259 and 260 are energised and the condenser 263 begins to charge. The contacts *g, h* and *i, j* and *k, l* are now brought together with the following effects:

(1) *i, j* connect terminals 254 and 251 and hence winding 250 (Fig. 4) is energised from network 252, and contact 246 is drawn away from contact 247. The dummy load 248 is therefore effectively removed from its position across the terminals 52, 52A.

(2) *g, h* connect terminal 256 to lead 66. Hence terminal 52 is connected to lead 66 (Figs. 1 and 4), thus bringing the loudspeaker 26 into operation.

(3) *k, l* connect lead 67 to earth, thus completing the circuit of lamp L (Fig. 1) and bringing the latter into operation.

When the signal pulse energising the relay winding 257 ceases, contacts *a* to *f* resume their open position illustrated, with the result that the action solenoid 23 (Fig. 1) is de-energised. However, the condenser 263 is charged and proceeds to discharge through the closed circuit including the two windings 259 and 260. The latter therefore remain energised and hence the loudspeaker 26 is held in circuit as also the lamp L. The condenser 263 may be so chosen as to ensure a delay of, for example, two seconds before the contacts *g* to *l* are opened. This is important to ensure that the sound continuity is maintained whilst the solenoid 23 is intermittently operating. If the model H is to "speak" realistically then the mouth portion M must move for each syllable as well as for each word, whilst the corresponding sound is continuous. The same considerations would apply if the solenoid were connected mechanically to operate, say, the bow arm of a model violinist, appropriately to music simultaneously reproduced from the loudspeaker associated with the model.

It will be realized that more than five different activities may be arranged by increasing the number of different frequencies for dubbing on to the record/reproduce tape. Correspondingly the number of responsive circuits in the decoding unit must be increased as also the number of relay units.

I claim:

1. A display installation comprising a model for simulating an animate individual, a plurality of movable members combined with the model and arranged upon activation to cause animation thereof, mechanism coupled to the movable members for mechanical activation thereof, a sound reproducer disposed in the proximity of said model, a frequency responsive selection device, connections between said mechanism and said selection device, a first component transducer arranged to be responsive to a recorded sound track on a tape, a second component transducer arranged to be simultaneously responsive to a recorded multi-frequency action track on said tape, said first and second component transducers together constituting a tape record transducing apparatus, said action track having thereon signals of different frequencies indicative of particular mechanical activations for the model related to the recorded sounds, connections between said first component transducer and said sound reproducer, and connections between said second component transducer and said frequency responsive selection device, said frequency responsive selection device being arranged to respond sequentially to the signals of different frequencies by permitting selectively according to the nature of a signal, mechanism of the model to activate the latter.

2. A display installation comprising a plurality of models for simulating animated individuals, each model having at least one movable member combined with a model and arranged upon activation to cause animation thereof, mechanism coupled to the movable members for mechanical activation thereof, sound reproducer means disposed in the proximity of said models, a frequency responsive selection device, connections between said mechanism and said selection device and between said sound reproducer means and said selection device, transducing apparatus, a first component transducer arranged to be responsive to a recorded sound track on a tape, a second component transducer arranged to be simultaneously responsive to a recorded multi-frequency action track on said tape, said first and second component transducers together consituting a tape record transducing apparatus, said action track having thereon signals of different frequencies indicative of particular mechanical activations for the models related to the recorded sound, connections between said first component transducer and said frequency responsive selection device, and connections between said second component transducer and said frequency responsive selection device, said frequency responsive selection device being arranged to respond sequentially to the signals of different frequencies by permitting selectively according to the nature of a signal, mechanism of a selected model to activate the latter whilst the sound reproducer means of said model is connected to said first component transducer.

3. A display installation as claimed in claim 2, and further comprising time delay means associated with said frequency responsive selection device to cause delay in the disconnection of the sound reproducer of a selected model, the delay being with reference to the end of an action signal that caused the selection.

4. A display installation as claimed in claim 1, wherein the frequency responsive selection device takes the form of a decoding device consisting of a number of tuned circuits connected in parallel to each other, and each individually resonant to different predetermined frequencies and arranged all to experience an input from the second component transducer responsive to action signals, the latter being arranged to consist of sequential pulses at any one of such predetermined frequencies, whereby said tuned circuits may individually respond to an action signal pulse.

5. A display installation as claimed in claim 2, wherein the frequency responsive selection device takes the form of a decoding device consisting of a number of tuned circuits connected in parallel to each other, and each individually resonant to different predetermined frequencies and arranged all to experience an input from the second component transducer responsive to action signals, the latter being arranged to consist of sequential pulses at any one of such predetermined frequencies, whereby said tuned circuits may individually respond to an action signal pulse.

6. A display installation as claimed in claim 1, and further comprising a dubbing unit for dubbing action signals on the action track of the tape of said tape record transducing apparatus, said signals consisting of sequential pulses at chosen predetermined frequencies, said dubbing unit comprising means for generating an output consisting of electrical pulses at various predetermined frequencies but with substantially constant amplitude, means for selecting the frequency at will, a connection from said output to the second component transducer when said second component transducer is acting as a recorder, and control means for determining when, and the duration of, a pulse transmitted from said output through said connection to said second component transducer.

7. A display installation as claimed in claim 2, and further comprising a dubbing unit for dubbing action signals on the action track of the tape of said tape record transducing apparatus, said signals consisting of sequential pulses at chosen predetermined frequencies, said dubbing unit comprising means for generating an output consisting of electrical pulses at various predetermined frequencies but with substantially constant amplitude, means for selecting the frequency at will, a connection from said output to the second component transducer when said second component transducer is acting as a recorder, and control means for determining when, and the duration of, a pulse transmitted from said output through said connection to said second component transducer.

8. A display apparatus as claimed in claim 6, wherein said control means includes a device responsive to the output of the first component transducer, and switch means controlled by said responsive device.

9. A display apparatus as claimed in claim 7, wherein said control means includes a device responsive to the output of the first component transducer, and switch means controlled by said responsive device.

10. A display installation as claimed in claim 6, wherein the generating means consist of a series of circuits parallel connected to each other and each having a predetermined resonant frequency, switch means to bring any selected one of said circuits into association with an oscillator valve to cause the latter to oscillate at a desired frequency depending upon the chosen resonant circuit.

11. A display installation as claimed in claim 7, wherein the generating means consists of a series of circuits parallel connected to each other and each having a predetermined resonant frequency, switch means to bring any selected one of said circuits into association with an oscillator valve to cause the latter to oscillate at a desired frequency depending upon the chosen resonant circuit.

References Cited in the file of this patent

UNITED STATES PATENTS

| | | |
|---|---|---|
| 2,116,314 | Jenkins et al. | May 3, 1938 |
| 2,213,512 | Bailer | Sept. 3, 1940 |
| 2,246,381 | Paull | June 17, 1941 |
| 2,247,329 | Dietz | June 24, 1941 |
| 2,270,142 | Robinson et al. | Jan. 13, 1942 |
| 2,334,541 | Ferris et al. | Nov. 21, 1943 |
| 2,335,277 | Heller | Nov. 30, 1943 |
| 2,346,905 | Chedister | Apr. 18, 1944 |
| 2,367,293 | Levinson | Jan. 16, 1945 |
| 2,503,083 | Waller | Apr. 4, 1950 |
| 2,558,490 | Koci | June 26, 1951 |
| 2,615,989 | Thad | Oct. 28, 1952 |

FOREIGN PATENTS

| | | |
|---|---|---|
| 420,361 | Great Britain | Nov. 28, 1934 |